United States Patent [19]
Richards

[11] Patent Number: 5,433,285
[45] Date of Patent: * Jul. 18, 1995

[54] THREE WHEELED VEHICLE

[76] Inventor: Donald C. Richards, P.O. Box 685, Walpole, N.H. 03608

[*] Notice: The portion of the term of this patent subsequent to Sep. 28, 2010 has been disclaimed.

[21] Appl. No.: 127,074

[22] Filed: Sep. 27, 1993

Related U.S. Application Data

[63] Continuation of Ser. No. 824,343, Jan. 23, 1992, Pat. No. 5,248,011.

[51] Int. Cl.6 ............................................. B62D 61/08
[52] U.S. Cl. ................................................... 180/215
[58] Field of Search ............... 280/276, 103, 98, 92, 280/691, 696; 180/215, 216, 210

[56] References Cited

U.S. PATENT DOCUMENTS

| | | |
|---|---|---|
| 1,242,500 | 10/1917 | Wilcox . |
| 1,356,658 | 10/1920 | Ray . |
| 2,966,951 | 1/1961 | Lang . |
| 4,263,977 | 4/1981 | Willett . |
| 4,589,510 | 5/1986 | Düerwald et al. . |
| 4,860,850 | 8/1989 | Takahashi ............... 180/215 |
| 5,020,624 | 6/1991 | Nesterick et al. . |
| 5,094,313 | 3/1992 | Mauws . |
| 5,248,011 | 9/1993 | Richards ............... 180/215 |

FOREIGN PATENT DOCUMENTS

| | | | |
|---|---|---|---|
| 2-45287 | 2/1990 | Japan | 280/276 |
| 304928 | 10/1951 | Switzerland | 280/276 |

*Primary Examiner*—Karin L. Tyson
*Attorney, Agent, or Firm*—Richard C. Litman

[57] ABSTRACT

A three wheeled vehicle has a steered front wheel and two driven rear wheels. A novel suspension has inner and outer members keyed to rotate in lockstep, but to accommodate axial travel of only the inner member. The inner member rises and falls with the front wheel as the vehicle negotiates uneven terrain, and the outer member is axially immobilized. Steering inputs are imposed on the outer member, which passes rotational movement to the inner member. The novel suspension incorporates a spring and shock absorber, and enables steering linkage to avoid vertical displacement imposed upon the suspension. In various embodiments, the vehicle accommodates one, two, or three passengers, and includes open or fully enclosed bodies.

6 Claims, 6 Drawing Sheets

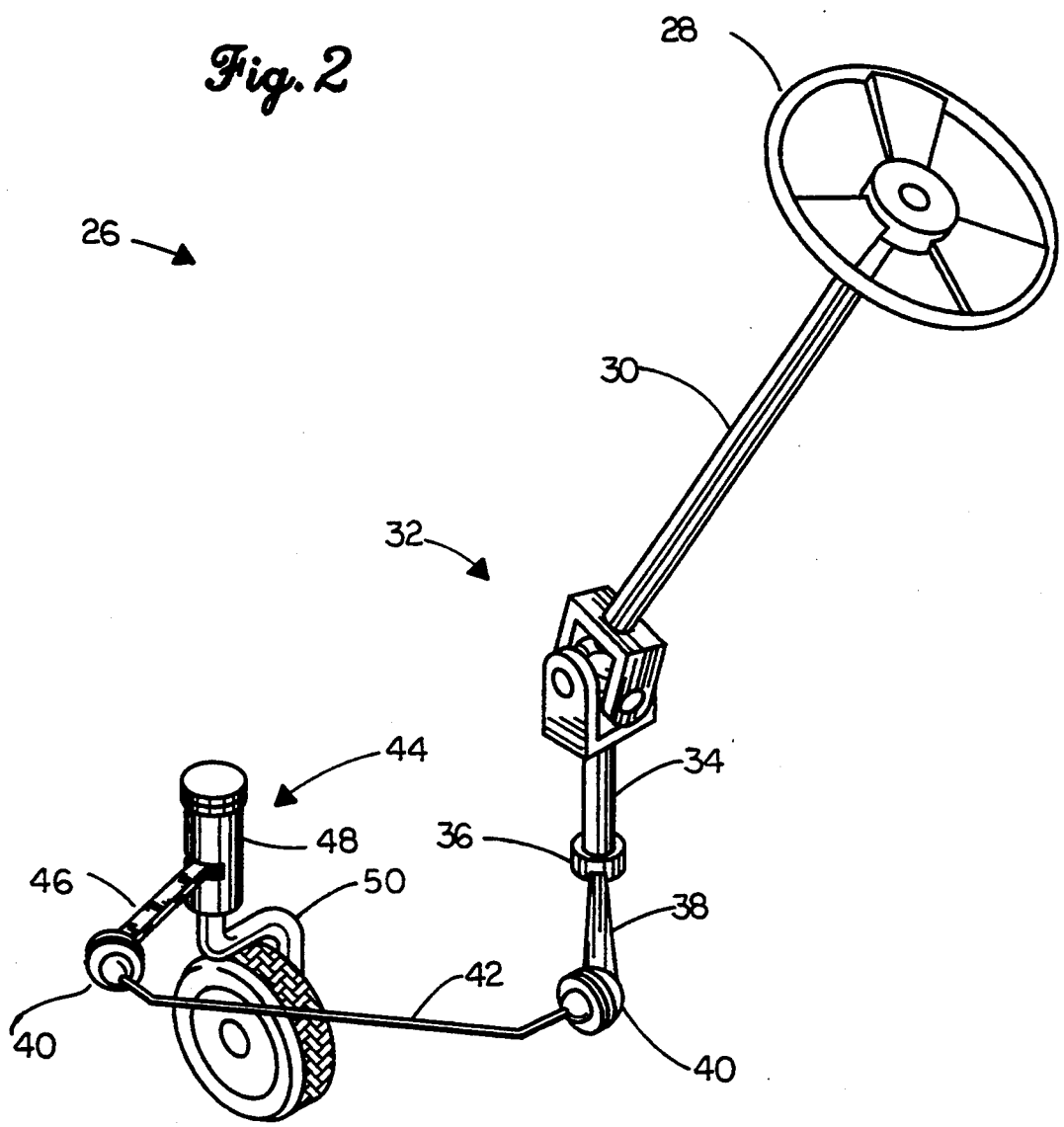

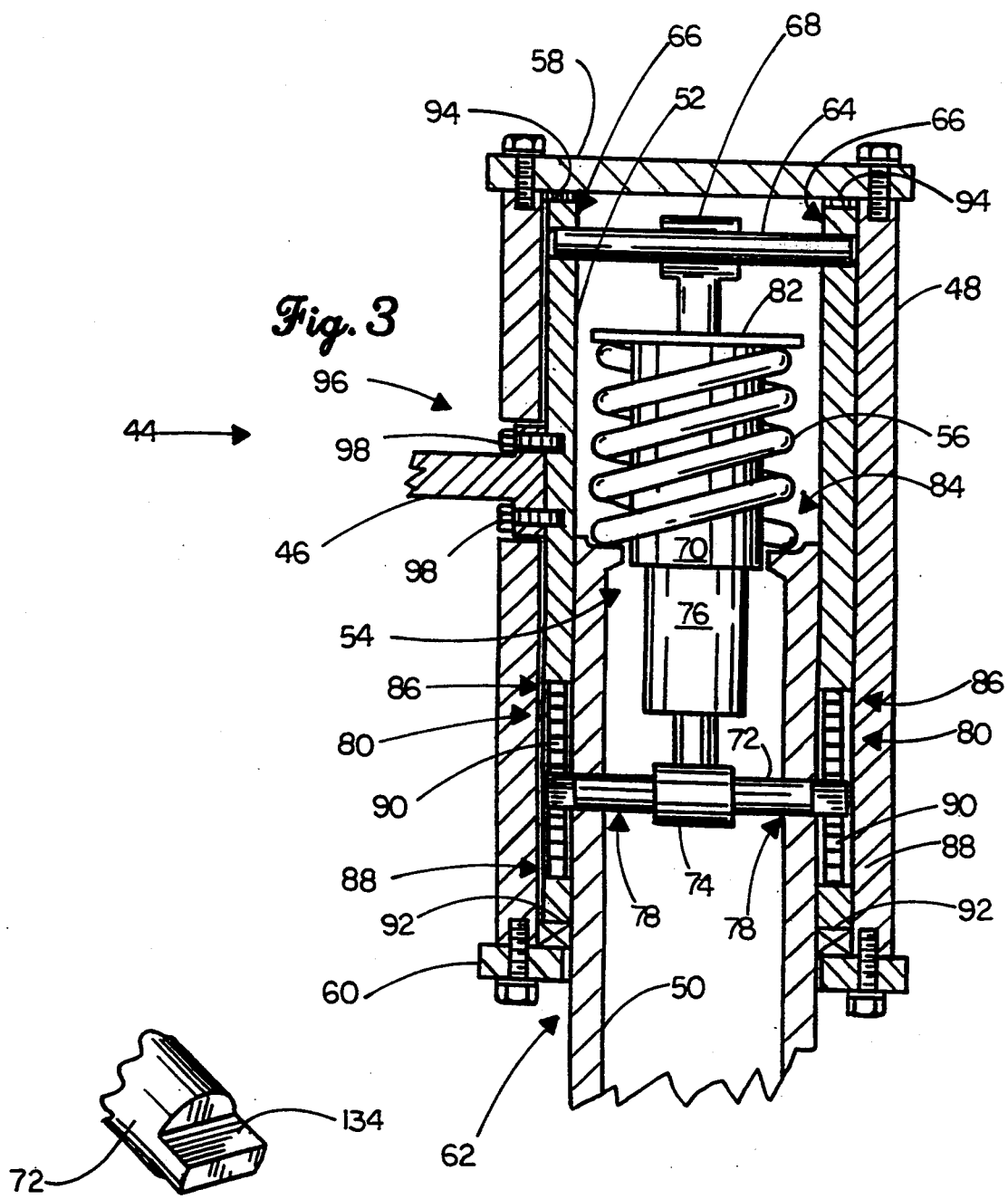

THREE WHEELED VEHICLE

CROSS REFERENCE TO RELATED APPLICATION

This application is a continuation-in-part of application Ser. No. 07/824,343, filed Jan, 23, 1992, now U.S. Pat. No. 5,248,011.

BACKGROUND OF THE INVENTION

1. Field of the Invention

The present invention relates to a three wheeled vehicle, and more particularly to a three wheeled vehicle having two driven rear wheels and a steered front wheel.

2. Description of the Prior Art

Powered vehicles which are uncomplicated and economical have been the subject of considerable efforts of design and manufacturing. One avenue of realizing a feasible light duty, economical vehicle has been to provide three wheels in lieu of the customary four wheel design. Depending upon the purpose, three wheeled vehicles having various steering and driving configurations have been proposed.

The particular combination of a single steered front wheel and two driven rear wheels is seen in U.S. Pat. Nos. 1,356,658, issued on Oct. 26, 1920 to Albert D. Ray; U.S. Pat. No. 5,020,624, issued on Jun. 4, 1991, to Elain M. Nesterick et al.; and U.S. Pat. No. 5,094,313, issued on Mar. 10, 1992 to Laurence J. Mauws. Ray discloses a tractor wherein a steering shaft is disposed at an angle to a steering fork, the former turning the latter by mutual geared engagement. The front wheel is not sprung.

Novelty of the scooter disclosed in Nesterick et al. '624 resides in its simple construction. The steering shaft is directly connected to the front wheel, which is unsprung. The same characteristics are seen in the utility vehicle shown in Mauws '313, which features a tubular frame to which panels are attached to complete the body.

Other three wheeled vehicles having various steering and driving configurations are known in the prior art. U.S. Pat. No. 1,242,500, issued to Newton K. Wilcox on Oct. 9, 1917, discloses a tractor having two rear wheels and one front wheel. The front wheel is steered, and all three wheels are driven. Two spring towers accommodate vertical displacement of axle travel. U.S. Pat. No. 2,966,951, issued on Jan. 3, 1961 to Ivan R. Lang discloses a golf cart having a steered front wheel and two rear wheels, one of which is driven. Lang attaches the front wheel to a steering fork by means of an intermediate, sprung, pivoting member.

A self-propelled mower is disclosed in U.S. Pat. No. 4,263,977, issued to Paul E. Willett on Apr. 28, 1981. A single front wheel is driven and steered. Two rear wheels support weight, but do not contribute to steering or driving.

U.S. Pat. No. 4,589,510, issued to Dierk Duerwald et al. on May 20, 1986, discloses an arrangement for steering all wheels of a three wheeled vehicle. A rod or cable is disposed longitudinally, or front-to-rear, to impose a steering input simultaneously on all wheels. A primary example is related to a vehicle having a single, driven front wheel and two rear wheels. However, the steering system is also adapted for reverse operation of such a vehicle, and which wheels are driven, and whether there are two front and one rear wheel, or the opposite, are not important.

None of the above inventions and patents, taken either singly or in combination, is seen to describe the instant invention as claimed.

SUMMARY OF THE INVENTION

For reasons of reduced cost, increased maneuverability, and economical operation, the present invention provides a three wheeled vehicle wherein a single front wheel is steered and two rear wheels are driven. All wheels are braked. The vehicle is superior to a traditional two wheeled motor cycle due to added stability and skidding resistance provided by having three wheels, and still reduces complexity, and outer dimensions, compared to four wheeled vehicles.

While the above inventions disclose aspects of simple, inexpensive, economical vehicles which are suitable for specific applications, there remain certain problems to be addressed in road going vehicles providing general transportation. The vehicles cited above have front suspensions which do not fully absorb impact of vertical displacement of the front wheel. It is desired to provide a front suspension for a front wheel which is sprung, and which effectively isolates steering linkage or steering shaft from impacts.

It should be noted that this is not accomplished even in most larger and more sophisticated four wheeled passenger sedans. In such vehicles, a parallelogram steering linkage has members typically connected, as by ball joints, to steering knuckles or to A-arms, both subject to vertical impacts.

Another area in which a three wheeled vehicle is superior to a four wheeled counterpart is in steering. Experience with single wheel steering indicates that eighty-five degrees of arc of steering rotation provides the ability to achieve very sharp turns. This is a great advantage to a vehicle in urban use, wherein parking and general maneuvering may be available only to vehicle having extreme maneuvering capabilities.

In the three wheeled vehicle of the present invention, a unique suspension strut assembly enables steering linkage to avoid vertical impacts imposed on the front wheel. The steering system includes a jointed steering shaft, so that the steering wheel is angled or oriented in an ergonometrically suitable fashion, yet a portion of the steering shaft is vertical, or nearly so. This provides the optimum compromise between compactness of overall vehicle dimensions and comfortable, convenient steering.

The novel vehicle is very practical in an urban setting. The novel strut and axle assembly eliminates the usual fork straddling the single front wheel, as is typically found on motorcycles. Suspension rebound at the front wheel is accommodated, while minimizing displacement of the steering linkage.

Accordingly, it is a principal object of the invention to provide a three wheeled vehicle having one steered front wheel and rear wheel drive.

It is another object of the invention to provide a three wheeled vehicle having a front strut and axle assembly which permits suspension rebound while accepting a steering input, and not subjecting steering linkage components to vertical motion during suspension rebound.

A futher object of the invention is to provide a maneuverable vehicle of reduced outer dimensions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a diagrammatic, perspective view of the steering system of the novel three wheeled vehicle.

FIG. 3 is a fragmentary, cross sectional detail view of a novel front suspension component shown in the lower left of FIG. 2, and drawn to enlarged scale.

FIG. 4 is a fragmentary, perspective detail view taken from the lower right of FIG. 3, and drawn to enlarged scale.

Similar reference characters denote corresponding features consistently throughout the attached drawings.

DETAILED DESCRIPTION OF THE PREFERRED EMBODIMENTS

Figure 1:
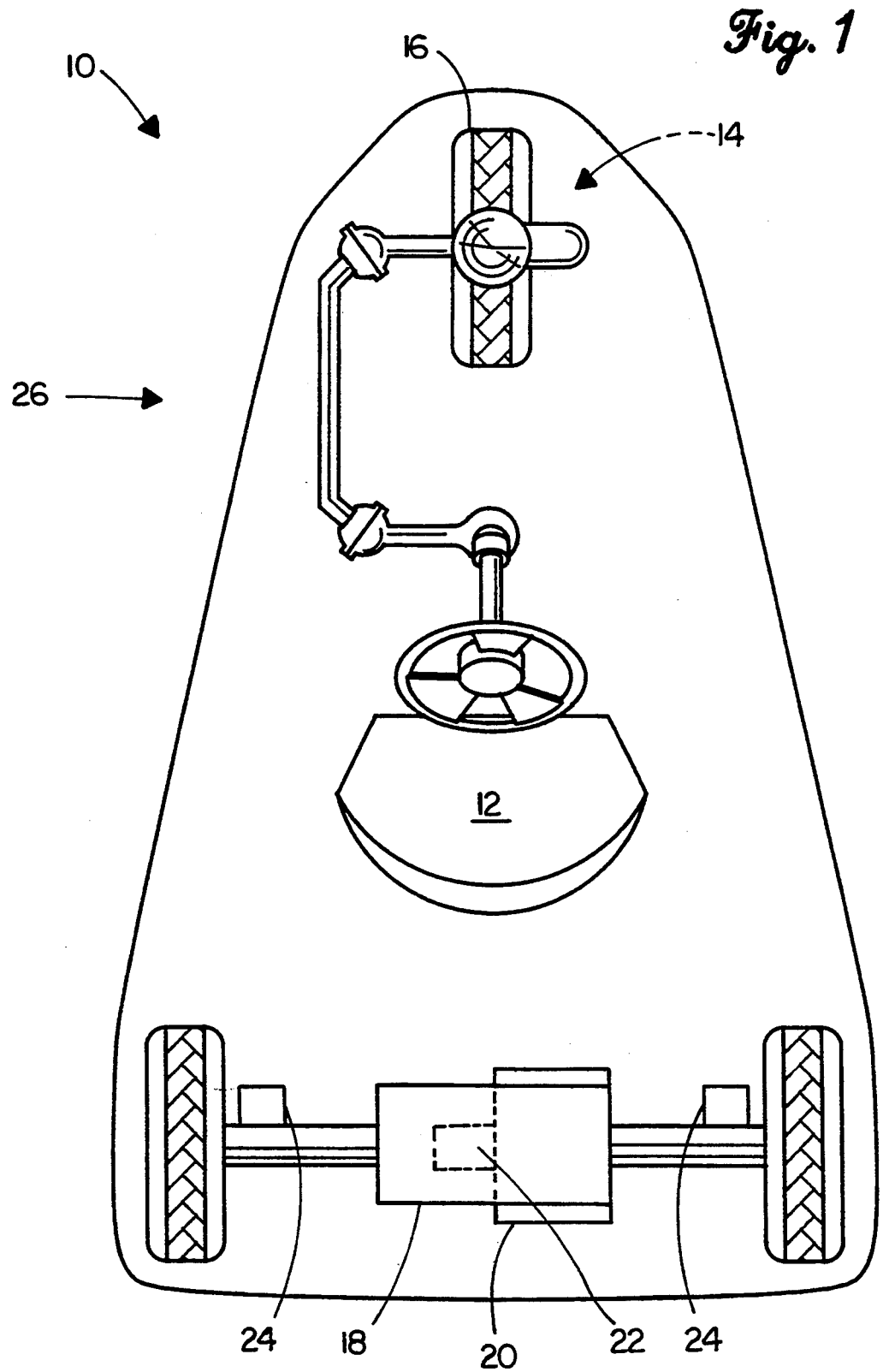
FIG. 1 is a diagrammatic, top plan view of the novel three wheeled vehicle.

The present invention is seen in FIG. 1 to comprise a three wheeled vehicle 10 having a passenger seat 12. The front axle 14 has a wheel 16 disposed thereon, this wheel 16 being steered in a novel fashion which will be described further hereinafter. An engine 18, a transmission 20, a differential gear assembly 22, and rear suspension 24 are located at the rear of vehicle 10. These components are of conventional construction, and no further description is required. In the same vein, the vehicle is provided with brakes (not shown) at all wheels. It is to be understood that major components of vehicle 10 such as steering linkage, engine 18, transmission 20 and similar items are to be secured to vehicle 10 in any suitable manner well known to those skilled in the art, and thus, further details are omitted.

As shown in FIG. 2, a steering linkage 26 provides translation of motion from a handle bar or steering wheel 28 to the front wheel 16. Steering wheel or handle bar 26 rotates a steering shaft 30 which includes a universal joint 32. A vertical extension 34 of steering shaft 30 extends to a flange 36 supporting a radius arm 38. Radius arm 38 terminates at a ball joint 40. A rod 42 transfers steering inputs from steering wheel 28 to a strut assembly 44 in the following way.

Rod 42 is attached to a front radius arm 46 by a second ball joint 40. Radius arm 46 is attached to a cylindrical housing 48 of front axle 14, which supports and turns front wheel 16 from a vertically oriented tubular member or axle member 50.

Member 50 enters and is supported within strut assembly 44, riding concentrically therewithin. Strut assembly comprises cylindrical housing 48, an inner rotating cylinder 52, a shock absorber 54, and suspension spring 56 or axle member.

Cylindrical housing 48 and inner rotating cylinder 52 provide inner and outer concentric members mechanically linked one to another, whereby the inner concentric member 52 can be axially displaced, while the outer concentric member 48 is axially immobilized. Inner rotating cylinder 52 is constrained to rotate upon receiving steering inputs from radius arm 46, and not to move axially. Axial displacement is prevented by upper and lower caps 58,60 bolted to cylindrical housing 48. Lower cap 60 has an orifice 62 defined therein allowing passage therethrough of tubular member of axle member 50.

A top pin 64 penetrating diametrically opposing bores 66 formed in inner rotating cylinder 52 also penetrates a boss 68 attached to an upper, stationary part 70 of shock absorber 54. Because top pin 64 is anchored within inner rotating cylinder 52, the upper, stationary part 70 of shock absorber 54 does not experience vertical displacement.

A bottom pin 72 penetrates a lower boss 74 formed in a lower, vertically displaceable portion 76 of shock absorber 54 and also penetrates diametrically opposed bores 78 in axle member 50. The bottom pin 72 extends beyond axle member or tubular member 50 into slots 80 formed in inner cylinder 52.

The suspension spring 56 is retained between an upper flange 82 secured to the shock absorber's upper part 70 and a lower flange 84 formed by a shoulder in axle member 50.

The bottom pin 72 keys axle member 50 to rotate in lockstep with inner rotating cylinder 52. Because of the elongated nature of slots 80, axle member 50 may slide axially within strut assembly 44 to a limited degree, which motion accommodates vertical displacement periodically encountered as front wheel 16 negotiates uneven terrain or minor obstructions in a road (not shown), such as potholes or stones. Upper and lower surfaces 86,88 (respectively) of slots 80 serve as stops limiting this motion. Therefore, within limits imposed by the elongated dimension of slots 80, axle member 50 and front wheel 16 rise and fall as road conditions dictate while being to rotate with, and thereby accept steering inputs from, inner rotating cylinder 52.

Bottom pin 72 is machined (see FIG. 4) to present a planar surface 134 facing the sides of slots 80. Again referring to FIG. 3, slots 80 have needle bearing assemblies 90 to reduce wear due to frictional contact as bottom pin 72 rises and descends therein.

Roller bearings 92 support inner cylinder 52 within cylindrical housing 48. Washers 94 having surfaces exhibiting low friction, such as provided by coating with polytetrafluoroethylene compounds, for example, are employed at the top of inner cylinder 52.

An aperture 96 defined in cylindrical housing 48 allows communication of radius arm 46 with inner cylinder 52, to which radius arm 46 is suitably fastened, as by bolts 98.

Figure 5:
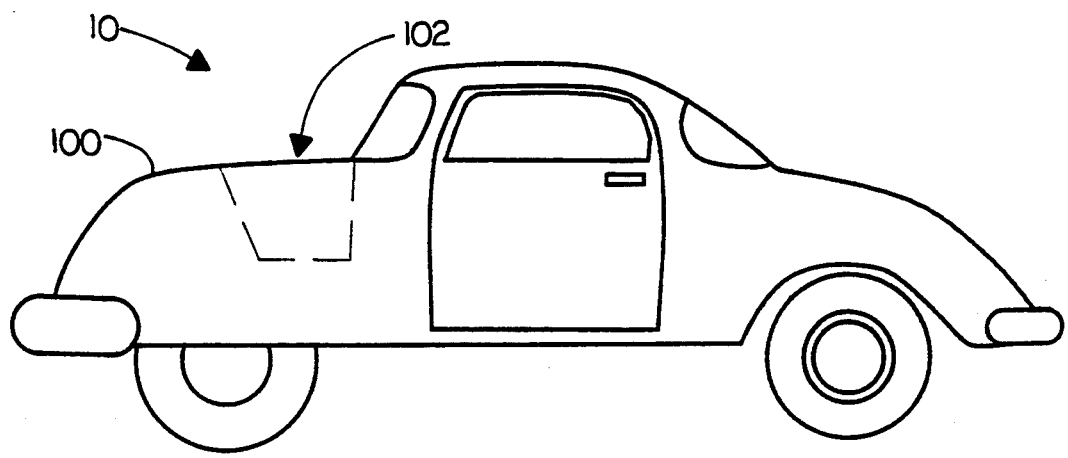
FIGS. 5 and 6 are diagrammatic, side elevational views of two embodiments of the invention, respectively illustrating closed and open body styles.
Figure 6:
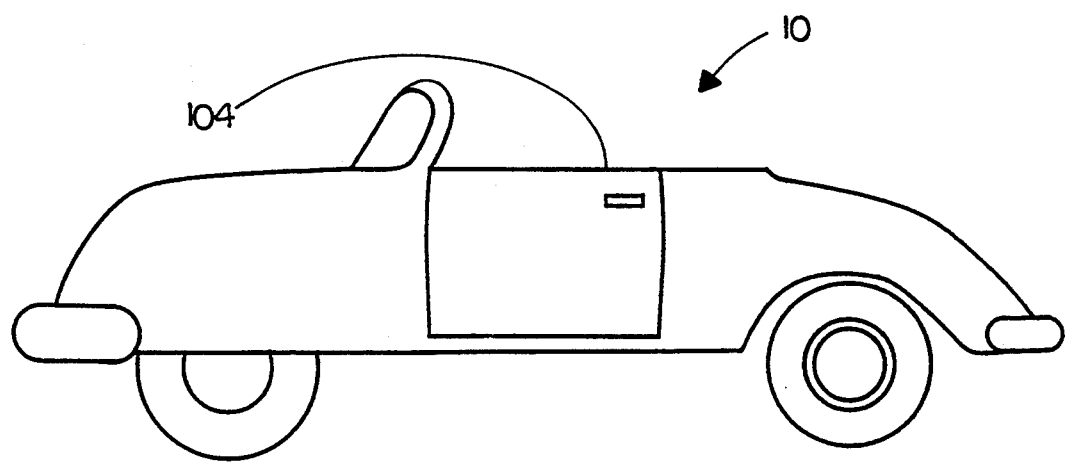

Turning now to FIG. 5, the novel vehicle 10 is seen to have, in one embodiment, a fully enclosed body 100. This closed body 100 provides a concealed storage space 102. In another embodiment, as shown in FIG. 6, vehicle 10 has an open body 104.

Figure 7:
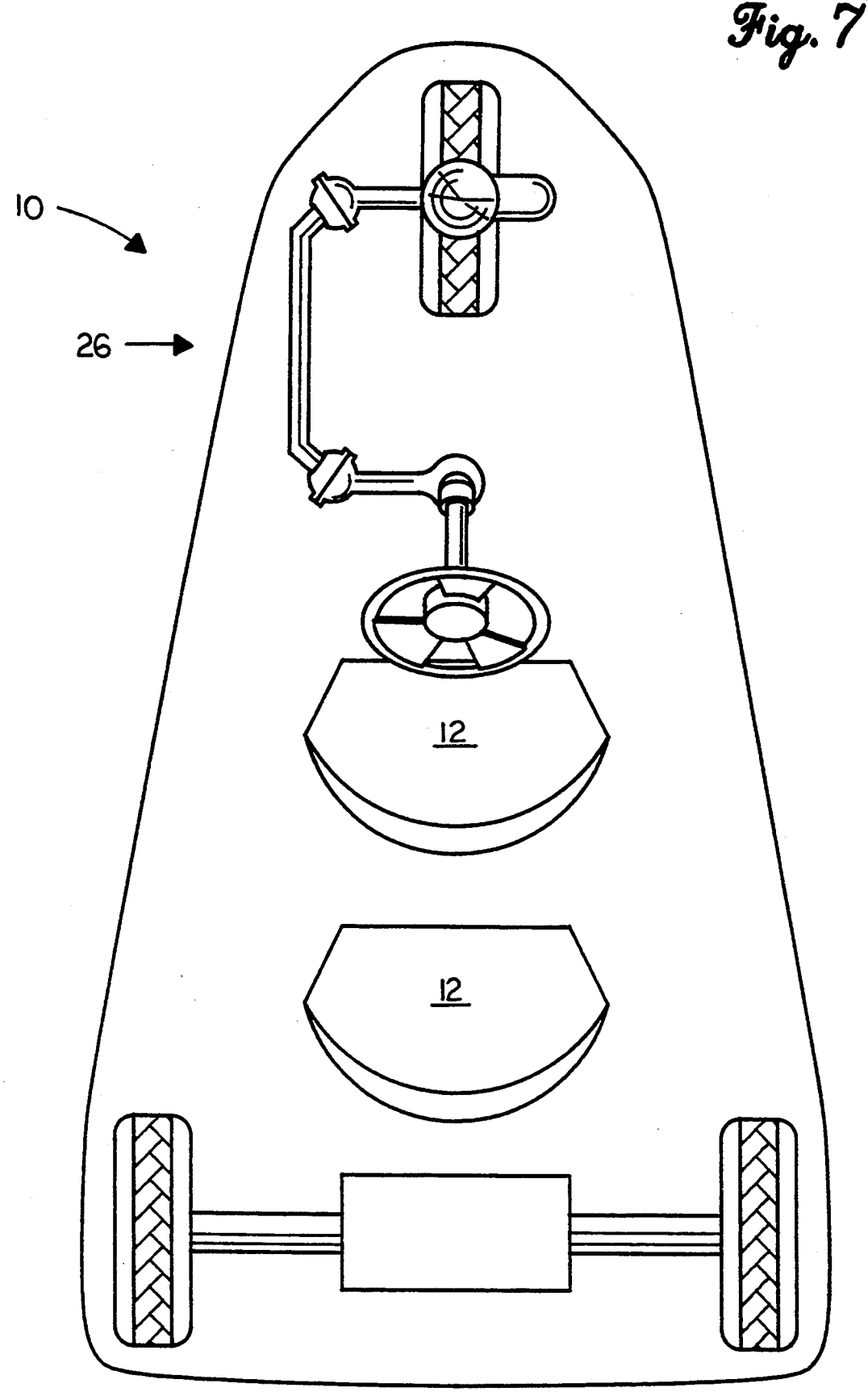
FIGS. 7 and 8 are diagrammatic, top plan views of two embodiments of the invention, respectively illustrating two and three seat configurations of the novel three wheeled vehicle.
Figure 8:
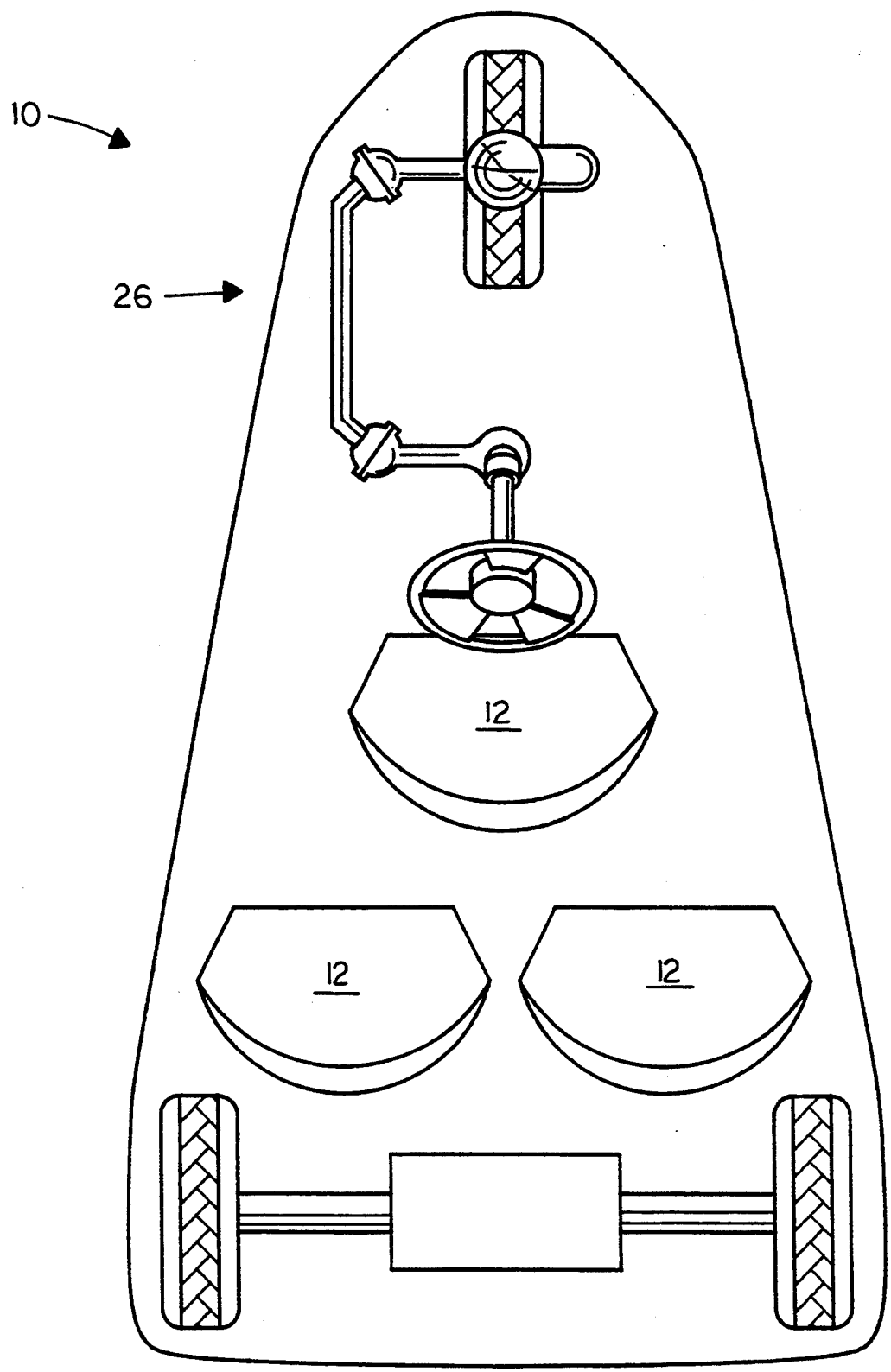

Seating arrangements other than that of the single seat 12 of FIG. 1 are possible. Shown in FIGS. 7 and 8 are, respectively, two seats 12 disposed in tandem, and three seats 12, there being one front seat 12 and two seats 12 disposed therebehind.

Thus, the novel three wheeled vehicle 10 simulates a conventional four wheeled automobile automobile, while improving thereon by having three wheels, reduced weight and complexity, and improved maneuverability, while retaining certain advantages of conventional vehicles.

It is to be understood that the present invention is not limited to the sole embodiment described above, but encompasses any and all embodiments within the scope of the following claims.

I claim:

1. In a three wheeled vehicle having:
a front axle and rear axle mounted thereon, one front wheel disposed upon said front axle and two rear wheels disposed upon said rear axle, said vehicle including at least one passenger seat mounted therein, power means mounted within said vehicle, transmission means operably connected to said power means and to said rear wheels, thereby driving said rear wheels, suspension means for said two rear wheels, and steering means mounted to said vehicle and to said front wheel, said steering means controlling said front wheel, the improvement comprising:
a suspension means of the one front wheel including inner and outer concentric members,
spring means and shock absorbing means disposed within said inner and outer concentric members,
said inner and outer concentric members being mechanically linked one to another, whereby said inner and outer concentric members rotate to the same degree while permitting said inner concentric member to be axially displaced while said outer concentric member is axially immobilized, and
whereby said front wheel is enabled to be vertically displaced relative to said three wheeled vehicle while being steered, and simultaneously maintains a portion of the weight of said three wheeled vehicle supported thereon.

2. The three wheeled vehicle according to claim 1, further including a steering linkage comprising a steering shaft and a steering member connected to said outer concentric member so as to cause said concentric member to rotate when said steering shaft is rotated, whereby said steering member and said steering shaft are isolated from vertical displacement imposed upon said front wheel, and therefore said inner concentric member, when said front wheel negotiates uneven terrain.

3. The three wheeled vehicle according to claim 2, further including a fully enclosed body.

4. The three wheeled vehicle according to claim 2, further including an open body.

5. The three wheeled vehicle according to claim 2, wherein said at least one seat includes two seats disposed in tandem.

6. The three wheeled vehicle according to claim 2, wherein said at least one seat includes one front seat and two seats disposed therebehind.

* * * * *